(12) United States Patent
Vijayakumar et al.

(10) Patent No.: US 10,965,541 B2
(45) Date of Patent: Mar. 30, 2021

(54) METHOD AND SYSTEM TO PROACTIVELY DETERMINE POTENTIAL OUTAGES IN AN INFORMATION TECHNOLOGY ENVIRONMENT

(71) Applicant: GAVS Technologies Pvt. Ltd., Chennai (IN)

(72) Inventors: Muraleedharan Vijayakumar, Chennai (IN); Veeramanikandan Pandiaraj, Chennai (IN); Mahesh Marimuthu, Chennai (IN); Govindaraj Muniyandi, Chennai (IN)

(73) Assignee: GAVS Technologies Pvt. Ltd., Chennai (IN)

( * ) Notice: Subject to any disclaimer, the term of this patent is extended or adjusted under 35 U.S.C. 154(b) by 90 days.

(21) Appl. No.: 15/977,419

(22) Filed: May 11, 2018

(65) Prior Publication Data

US 2019/0044825 A1 Feb. 7, 2019

(30) Foreign Application Priority Data

Feb. 19, 2018 (IN) .............................. 201841006251

(51) Int. Cl.
*H04L 12/24* (2006.01)
*G06F 11/00* (2006.01)
*H04L 12/26* (2006.01)
*G06F 16/34* (2019.01)

(52) U.S. Cl.
CPC .......... *H04L 41/147* (2013.01); *G06F 11/008* (2013.01); *H04L 41/06* (2013.01); *H04L 41/14* (2013.01); *H04L 41/22* (2013.01); *H04L 41/5016* (2013.01); *H04L 41/5074* (2013.01); *H04L 43/0876* (2013.01); *G06F 16/345* (2019.01); *H04L 43/16* (2013.01)

(58) Field of Classification Search
CPC ............... H04L 41/147; H04L 41/5016; H04L 43/0876; H04L 41/14; H04L 41/22; H04L 41/06; H04L 41/5074; H04L 43/16; G06F 11/008; G06F 17/30719; G06F 16/345; G06F 11/3452; G06F 11/3409; G06F 2201/81; G06F 11/3006; G06F 11/3055
See application file for complete search history.

(56) References Cited

U.S. PATENT DOCUMENTS 7,370,102 B1 * 5/2008 Chu .................... G06F 11/0709
709/223
8,738,972 B1 5/2014 Bakman et al.
(Continued)

*Primary Examiner* — Muhammad Raza
(74) *Attorney, Agent, or Firm* — Convergence Intellectual Property Law P.C; Jonathan Garfinkel

(57) ABSTRACT

A method and a system for determining and preventing outages in an IT network by predicting status, utilization, performance, or a combination thereof for IT resources is disclosed. The method includes extracting and classifying data for one or more parameters associated with a plurality of nodes. A set of historical metrics and real-time metrics are used for predicting status score, utilization score, and performance score of IT infrastructure resources. The predictions are compared with a predetermined threshold limit for identifying potential outage in the network. A summary indicating the predictions are displayed to an administrator for preventing and mitigating the potential downtime.

6 Claims, 6 Drawing Sheets

(56) References Cited

U.S. PATENT DOCUMENTS

| | | | |
|---|---|---|---|
| 8,762,298 B1* | 6/2014 | Ranjan | G06N 5/02 |
| | | | 706/12 |
| 8,903,983 B2 | 12/2014 | Bakman et al. | |
| 9,542,296 B1* | 1/2017 | Engers | G06F 11/3452 |
| 2007/0294562 A1* | 12/2007 | Takamatsu | G06F 11/3433 |
| | | | 714/4.1 |
| 2009/0064248 A1* | 3/2009 | Kwan | H04L 12/1868 |
| | | | 725/109 |
| 2015/0032884 A1* | 1/2015 | Greifeneder | H04L 67/10 |
| | | | 709/224 |
| 2015/0339263 A1 | 11/2015 | Abu et al. | |
| 2016/0088006 A1* | 3/2016 | Gupta | H04L 43/08 |
| | | | 726/23 |
| 2017/0308375 A1* | 10/2017 | Lehner | G06F 8/70 |
| 2018/0124097 A1* | 5/2018 | Tiwari | H04L 63/1425 |

* cited by examiner

METHOD AND SYSTEM TO PROACTIVELY DETERMINE POTENTIAL OUTAGES IN AN INFORMATION TECHNOLOGY ENVIRONMENT

CROSS-REFERENCES TO RELATED APPLICATIONS

This application claims priority to Indian patent application No. 201841006251, filed on 19 Feb. 2018, the full disclosure of which is incorporated herein by reference.

FIELD OF THE INVENTION

The present invention generally relates to algorithmic information technology operations (AIOps) and, in particular, to methods and systems for preventing outages in an IT environment.

DESCRIPTION OF THE RELATED ART

Many business organizations outsource services and products for resolving issues in information technology (IT) environment that may not be fixed in-house. Traditionally, small and medium sized organizations have used reactive type of support for IT infrastructure maintenance owing to the low costs involved. Reactive IT support help organizations to cut costs by paying for products or services as and when IT support is required. However, reactive IT support does not provide visibility into the entire IT infrastructure of the business. This may result in unforeseen errors either by humans or machines, thereby resulting in unplanned downtimes and outages.

More recently, many organizations are deploying proactive support, which is based on preventing potential disruptions in the IT environment. Proactive support involves constant monitoring and regular maintenance of various aspects of the IT environment. Such organizations prefer obviating potential server crashes, IT security vulnerabilities, downtimes, using predictive analytics.

Assessing the health IT infrastructure can help anticipate performance issues in future and enhance overall productivity of enterprises. However, monitoring and analyzing resources in the IT environment to predict downtime is complex challenge in itself. For instance, predictive analytics involves data-driven decision making, therefore, the types of data considered for prediction is extremely vital to foresee performance issues.

Various publications have attempted to address some of the challenges. U.S. Pat. No. 8,903,983 B2 (Bakman et al) and U.S. Pat. No. 8,738,972 B1 (Bakman et al) describe a method and apparatus for managing, modeling, predicting, allocating and utilizing resources and bottlenecks in a computer network. Similarly, US 20150339263 A1 (Abu El Ata et al) describes method for evaluating operation of a system architecture. However, these publications do not address the challenges of determining and preventing potential outages in IT environment based on utilization and performances of infrastructure resources.

SUMMARY OF THE INVENTION

The present subject matter relates to preventing outages in an IT environment.

According to one embodiment of the present subject matter, a method for determining potential outages in an information technology (IT) environment is disclosed. The method includes extracting, from one or more data sources, data for one or more parameters associated with a plurality of nodes in the IT environment. The data comprising at least utilization metrics, performance metrics, and a time identifier for each of the performance and utilization metric. The extracted data is classified as historical data or a current data based on the time identifier. A status score, utilization score, and performance score, of the plurality of nodes, or a combination thereof for the plurality of nodes from the classified data are predicted. Based on the predicted scores, a potential outage in the IT environment is determined. A summary indicating a potential outage in the IT environment is displayed in one or more devices.

According to an embodiment of the present subject matter, a system for determining potential outages in the IT environment is disclosed. The system comprises a user interface, one or more processing units, a memory unit coupled to the one or more processing units. The memory unit comprises at least a data extraction module, a data classifier module, a prediction module, and a display module. The data extraction module is configured to extract data for one or more parameters associated with a plurality of nodes in the IT environment. The data comprises at least utilization metrics, performance metrics, and a time identifier for each metric of the utilization and performance metrics. The data classifier module is configured to classify the data as historical data or a current data based on the associated time identifiers. The prediction module is configured to predict a status score, a utilization score, and a performance score, of each of the plurality of nodes based on the classified data and determine potential outage in the IT environment from the predicted scores. The display module is configured to display a summary indicating the potential outage in the IT environment.

According to another embodiment, the memory unit further comprises a training module, alert module, summary generation module, and a ticketing module. The training module is configured to train a prediction model based on the historical data using a machine learning algorithm. The alert module is configured to compare the predictions with a predetermined threshold limit to identify potential outage in the IT environment. Based on the potential outages the alert module sends alerts to one or more devices if the predicted scores exceed a threshold limit or potential outage is identified. The summary generation module is configured to generate a summary comprising at least trends and statistics associated with the predicted status, utilization, and performance, of the plurality of nodes. The data cleansing module is configured to detect inaccurate data in the data store and perform a corrective action on the data. The ticketing module is configured to generate and assign tickets to operators based on the prediction, forecast, and projection.

According to yet another embodiment, the present subject matter relates to a computer program product having non-volatile memory carrying computer executable instructions stored therein for determining potential outages in an information technology (IT) environment. The instructions comprising extracting, from one or more data sources, data for one or more parameters associated with a plurality of nodes in the IT environment, the data comprising at least utilization metrics, performance metrics and a time identifier for each of the utilization and performance metrics. The instructions include classifying the data as historical data or current data based on the time identifier and predicting a status score, an utilization score, a performance score, or a combination thereof for the plurality of nodes from the classified data. Further, the instructions include determining a potential outage in the IT environment from the predicted scores and displaying a summary, in one or more devices, indicating the potential outage.

This and other aspects are set forth herein.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE EMBODIMENTS

Figure 1:
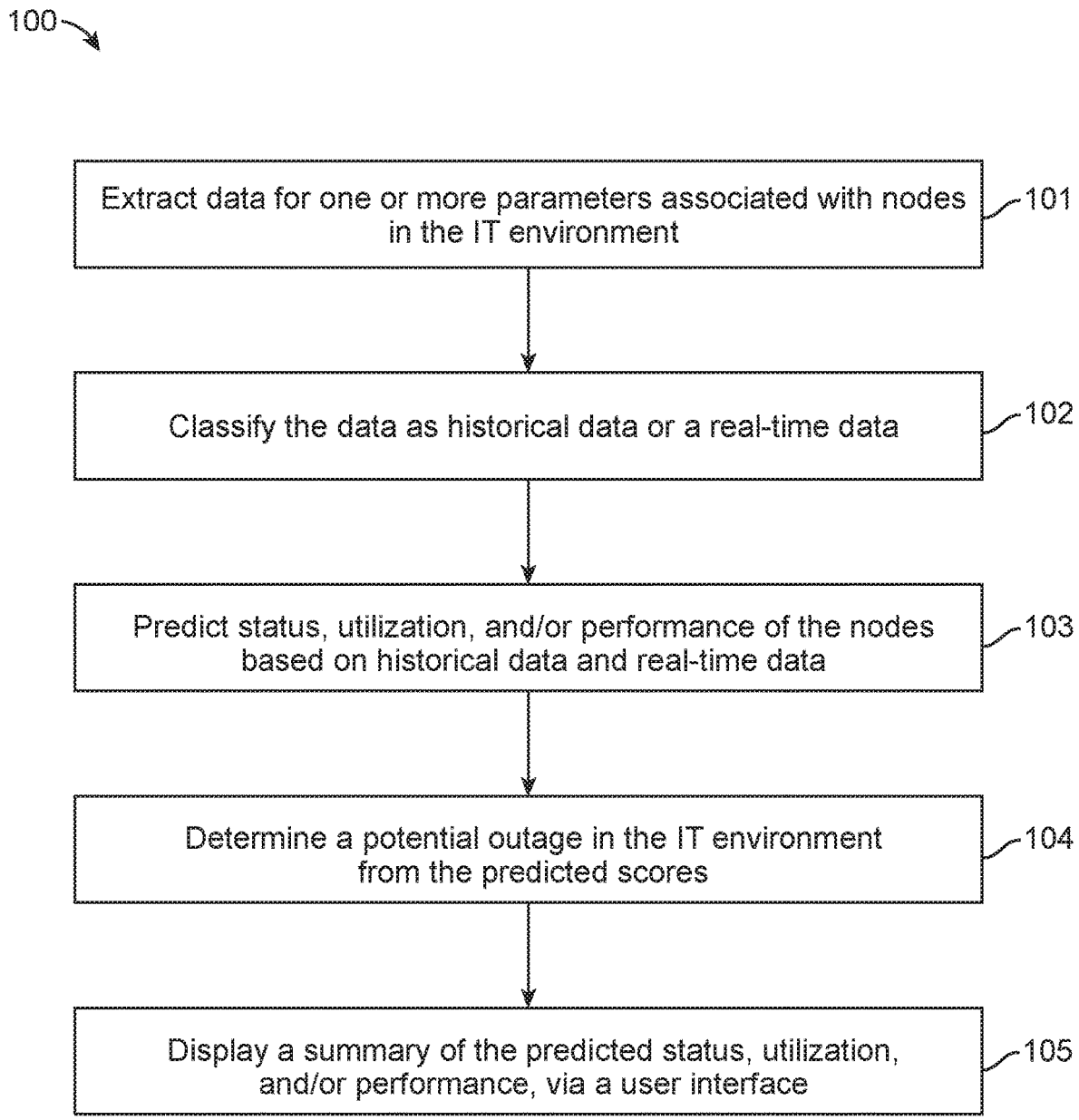
FIG. 1 illustrates a flow chart for a method of determining a potential outage in information technology environment, according to an embodiment of the present subject matter.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The following paragraphs provide a list of terminologies used in the description. The definitions are intended to establish a context for the present subject matter and not meant to be limited in scope or otherwise.

"Outage" refers to a period when one or more systems in a network fail to perform their primary functions and operations. Outages may occur due to several reasons, such as unplanned events, exceptional events, network errors, anomalies, routine maintenance, etc. The term "outage" may be collectively referred to as downtime or network outage.

"Information Technology environment" or "IT environment" refers to hardware, software, network resources and services required for the existence, operation and management of an enterprise network. IT environment may include one or more networks each comprising set of components that are the foundation of the IT services.

"Performance" refers to the operation or functioning of the network nodes at the desired level. Performance is usually estimated based on the metrics of the infrastructure resources, such as CPU, network, etc.

"Utilization" refers to a measure of consumption of the resources in a network. Each device utilizes resources from the server and network for carrying out respective functions. Utilization is usually estimated based on the metrics of the infrastructure resources, such as memory, disk, etc.

"Status" refers to the condition of a node in the network. Status may indicate the probability of failure at the node, degradation of the functions of the node, etc.

"Nodes" refer to a device or system in the network that can receive, create, store or send data along distributed network routes. Nodes may include web servers, application servers, database servers, laptops, computers, mobile devices, smart devices, etc.

A method and a system for determining and preventing outages in a network is disclosed. The method and system allows for predicting one or more of status, utilization, or performance of IT resources. The present subject matter includes extraction and classification of metrics for one or more parameters associated with a plurality of nodes. A set of historical metrics and real-time metrics are used for predicting status score, utilization score, and performance score of IT infrastructure resources. The predictions are used for preventing and mitigating potential downtime in the network.

In some embodiments, a method 100 for predicting status, utilization, performance, or a combination thereof for network nodes in an IT environment is provided as illustrated in FIG. 1. The method 100 includes extracting data or metrics related to one or more parameters associated with network nodes from one or more data sources. The data sources may be configured to continually or periodically store the data. The data extraction may be done periodically or upon a user request. The data may include at least utilization metrics and performance metrics of the infrastructure resources associated with the nodes. The data also includes a time identifier corresponding to each metric. The time identifier may indicate the time at which the metric was captured by the data sources. The data sources may include service desk tools or service monitoring tools deployed in each of the nodes in the network. The nodes may primarily include servers, such as web server, application server, database server, and user devices.

The extracted data is classified as historical data or a real-time data or current data based using predetermined criteria, at block 102. For instance, data that was captured prior to a predefined time limit may be considered as historical and the data captured after the predefined time limit may be current data or real-time data. Alternatively, data used as training dataset for training a machine learning model may be stored as historical data and data that may be used as testing dataset may be stored as real-time data.

A status score, utilization score, performance score, or a combination thereof are predicted based on the historical data and the current data, at block 103. The utilization and performance of the resources may include data related to memory, disk, central processing unit (CPU), etc. The status may indicate a failure status of the nodes, supplemented with information including, but not limited to, root cause analysis, time, reason, severity, probability of potential failure of the node, etc. A potential outage is determined in the IT environment from the predicted scores at block 104. The determination may include comparison of the predicted score and a predetermined threshold limit set by an administrator.

A summary of the predicted status, utilization and performance is displayed via a user interface, at block 105. The summary may indicate a potential outage of the IT environment based on which an administrator may take appropriate actions. For example, the summary may indicate an impending spike in memory usage of a particular server due to peak time. The administrator may learn the same from the summary and may delegate an operator or technician to optimize memory usage during that period.

Figure 2:
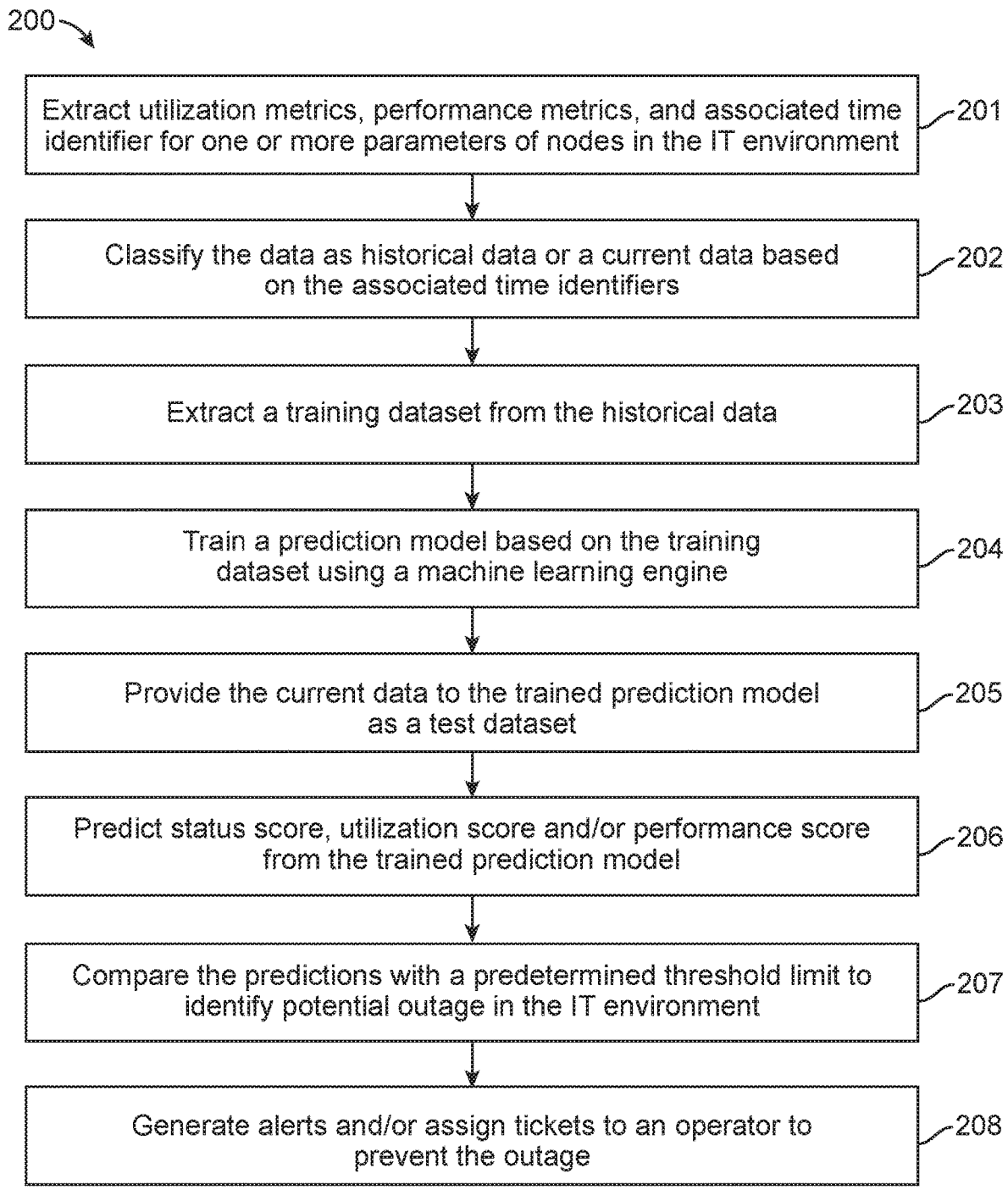
FIG. 2 illustrates a flow chart for a method for preventing outages in an IT environment, according to an embodiment of the present subject matter.

According to another embodiment, a method 200 for preventing outages in the IT environment network is illustrated in FIG. 2. The method 200 includes extracting at least utilization metrics, performance metrics, and associated time identifier, for one or more parameters of nodes in the IT environment, at block 201. The extracted metrics are classified as historical data or a current data, at block 202. A status score, utilization score, performance score, or a combination thereof is predicted as described in 203-206. The prediction comprises extracting a training dataset from the historical data, which may be stored in the data store at block 203. The training dataset may be provided as an input to a prediction model. The prediction model may be trained based on the training dataset using a machine learning engine, at block 204. In some embodiments, the model may be trained using supervised learning, unsupervised learning, or semi-supervised learning.

The current data, which may also be stored in the data store, is provided to the trained prediction model as a test dataset, at block 205. In some embodiments, historical data that have not been used in the training dataset may also be included in the test dataset. Based on the test dataset, a status score, utilization score, and performance score is obtained from the trained prediction model at block 206. The predictions are compared with a predetermined threshold limit to identify potential outage in the IT environment, at block 207. The predetermined threshold limit may be provided by the administrator to ensure that the predictions of status, utilization, and performance are not drastically changed. 208. the tickets may be created automatically or manually by the administrators.

Figure 3:
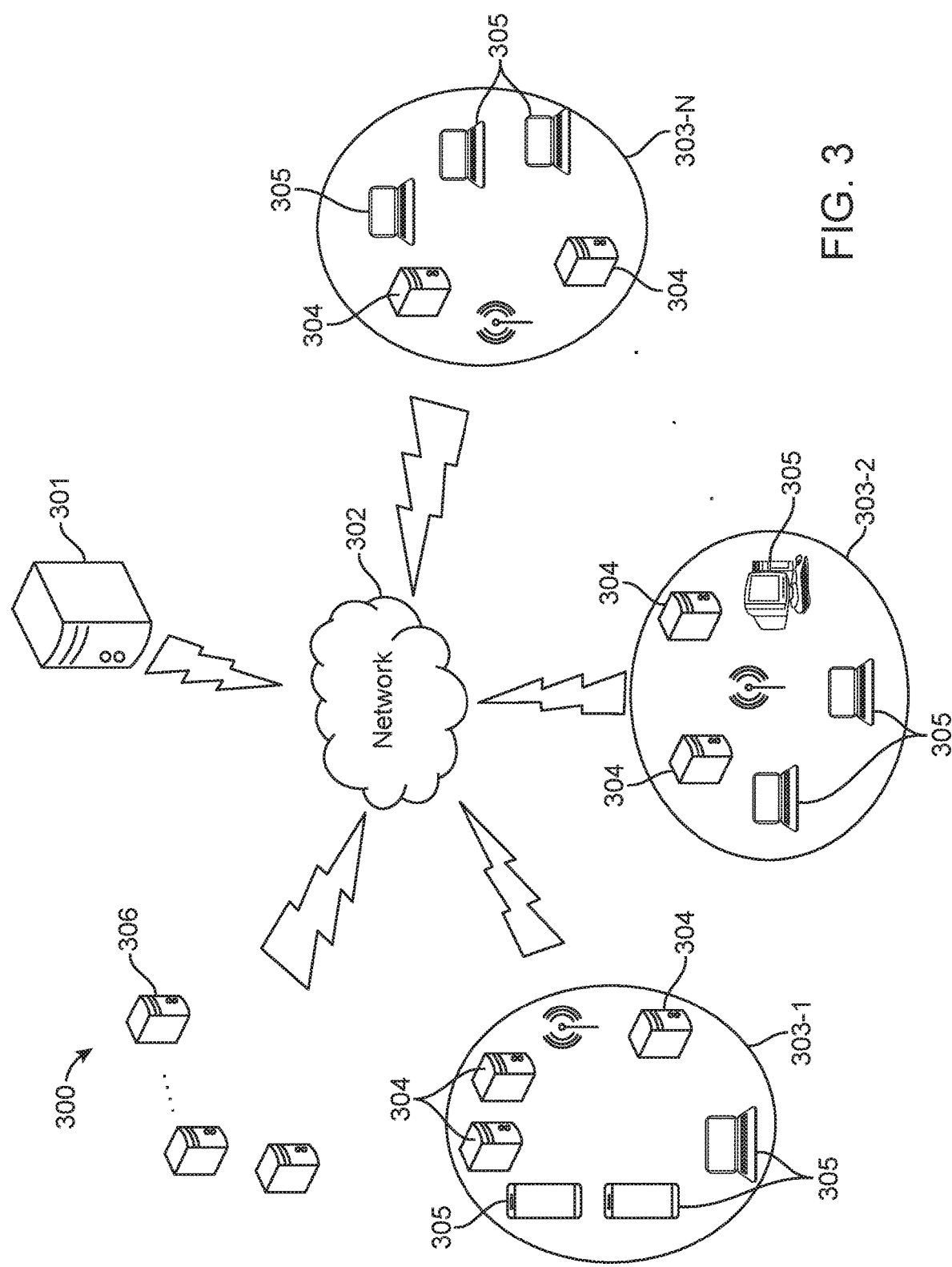
FIG. 3 illustrates a network architecture comprising a system for preventing outages, according to an embodiment of the present subject matter.

According to an embodiment, a network architecture of the IT environment 300 comprising a system 301 for determining application health is illustrated in FIG. 3. The architecture may include the system 301, one or more local networks 303-1-303-N comprising one or more servers 304, one or more end user devices 305, all of which may be connected over the network 302. The one or more servers 304 render essential services required in IT environments. In some examples, the servers may include web servers for delivering content or services to end users through the network; application servers to facilitate installation, operation, hosting of applications; database servers to run database applications.

Each local network 303 may not necessarily be located in the same location, however, they may be located in a close proximity. For example, each local network 303 here may refer to networks established in different organizations in a business cluster, which may be an agglomeration of one or more of manufacturing-related companies, services-related companies, or IT companies. In one example, each local network 303-1-303-N may use the services rendered by the one or more servers 306.

The end user devices 305 may include laptop computers, tablet computers, desktop computers, smartphones, personal digital assistants (PDA), smart devices, or the like. In some embodiments, the devices may be configured to utilize various communication protocols, such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), 5G, 5G-New Radio, and Worldwide Interoperability for Microwave Access (WiMAX).

Figure 4:
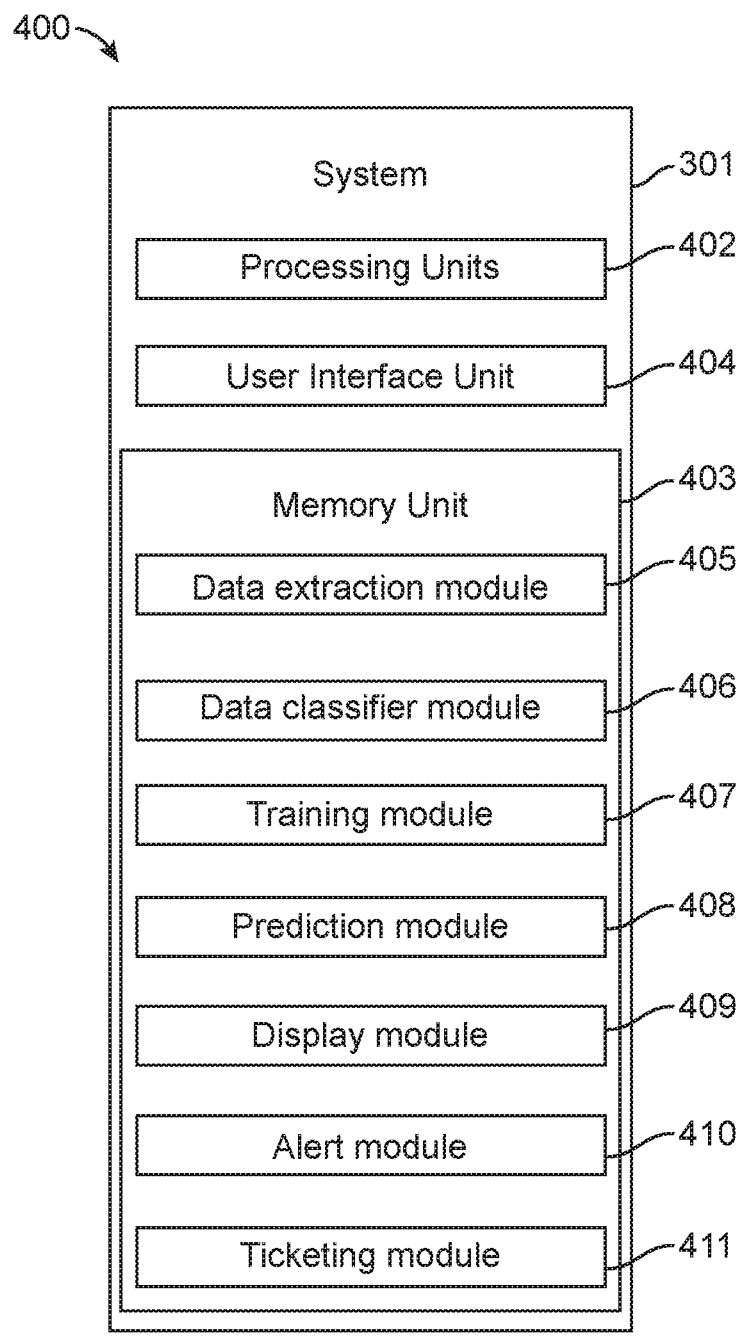
FIG. 4 illustrates a system for preventing outages in an IT environment, according to an embodiment of the present subject matter.

The system 301 for preventing outages in the IT environment is illustrated in FIG. 4, according to an embodiment of the present subject matter. The system 301 primarily includes one or more processing units 402, a memory unit 403, a user interface 404, and a network interface. The network interface enables the system to communicate with one or more nodes in the IT environment. The one or more nodes may be end user devices 305, one or more servers 306, one or more servers in the local networks 303-1-303-N. Further, the user interface 404 enables a person, such as the IT administrator, to interact with the system 301.

The memory unit 403 may include a data extraction module 405, a data classifier module 406, a training module 407, a prediction module 408, display module 409, alert module 410, and a ticketing module 411. The modules may be implemented as software code to be executed by the one or more processing units 301 using any suitable computer language. The software code may be stored as a series of instructions or commands in the memory unit 302.

The data extraction module 405 is configured to extract data for one or more parameters associated with a plurality of nodes in the IT environment. The data may be extracted using components, such as counters, which can determine performance of the nodes. In one embodiment, the components may also include various data sensing devices known in the art for data extraction. In some embodiments, the data extraction module may communicate with a plurality of agents for collecting information related to the parameters from the one or more end users and servers. The plurality of agents may be computer programs, such as bots, which may work in a specific device or network. The agents may reside in the system and may be invoked to perform specific tasks, such as collecting and reporting information related to the parameters. The agents may be autonomous and not require user interaction to perform the tasks for the data extraction module. In other embodiments, the data provided by counters may be consumed by the plurality of agents, which communicate with the data extraction module 405. The interaction between the modules, agents, counters may be performed by connectors (e.g. API). The data extraction module may receive the data as bits, which are processed by other modules and ultimately provided to an operator as graphical output.

Figure 5:
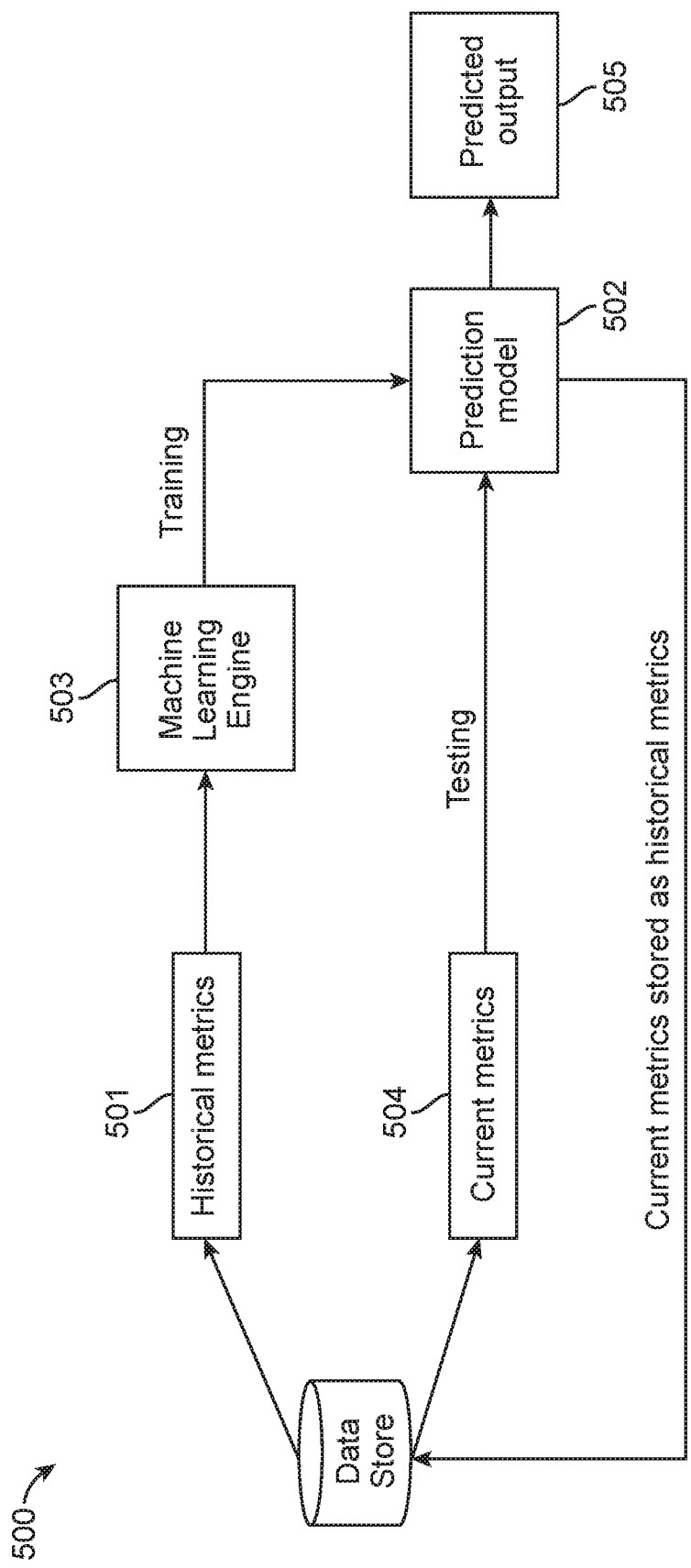
FIG. 5 illustrates a block diagram illustrating the training and prediction, according to an example of the present subject matter.

The data classifier module 406 is configured to classify the extracted data. The data classifier module may include a classifier for categorizing the data as historical data or a current data based on the associated time identifiers. The training module 407 is configured to train a prediction model based on the historical data using a machine learning engine. The historical data is used as a training dataset, which is provided as an input to the training model. In some embodiments, the data classifier module 406 may be configured to categorize the data as historical if it has been used in a training dataset. Further, the prediction module 408 is configured to feed the current data to the prediction model for predicting status score, utilization score, and performance score of each of the plurality of nodes. Referring to FIG. 5, the historical metrics 501 are used for training the prediction model 502 using any machine learning algorithm 503, such as random forest, neural networks, logistic regression, decision tree, linear SVM, naïve bayes, and the like. The data provided by the agents in real-time may be retrieved from the data store as current metrics 504 and provided to the prediction model 502 as test dataset. The prediction model provides the predicted output 505, which is then used for determining whether a potential outage is likely.

Referring back to FIG. 4, the display module 409 is configured to display the summary of the potential outage in the IT environment. The summary may include at least trends and statistics associated with the predicted status, utilization, and performance, of the plurality of nodes. In one example, the summary may include overall application health status, event correlation, heat map, etc., for illustrating the prediction associated with the devices. The alert module 410 is configured to send alerts to one or more devices if the predicted scores or potential outage exceed a threshold limit. The predicted scores may be compared with a predetermined threshold limit to identify potential outage in the IT environment. The predetermined threshold may be provided by the administrator to gauge drastic changes in performance and utilization of the resources associated with the nodes. Further, the ticketing module 411 is configured to allocate tickets to the operators if the predetermined threshold limit is breached.

Further, automated workflows may be triggered to kill processes, which are consuming more utilization, based on the utilization anomaly predicted for a CPU, memory, etc. In scenarios where one or more servers may be on the verge of shutting down due to high demand during peak time, the system may automatically identify the processes that may be insignificant or may require substantial resources from the servers, with little relatively less importance. The automatic identification may be based on process identification made by operators in the past. Such information may be stored in registers or logs maintained by the system. In some examples, the training module 407 may be configured to train a model for detecting least significant or high consuming process.

Figure 6:
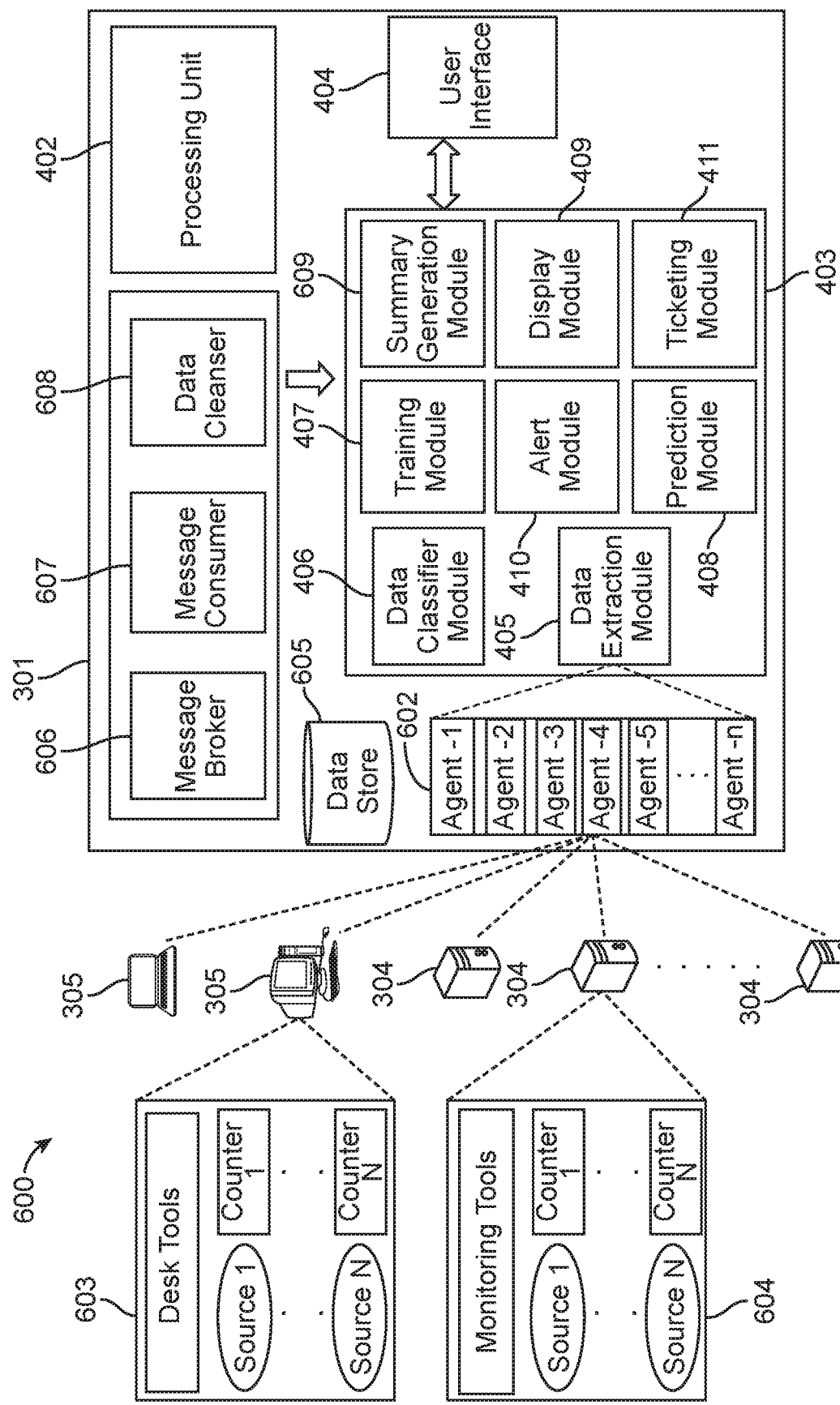
FIG. 6 illustrates a schematic of the system for predicting status, utilization, and performance of IT resources, according to an embodiment of the present subject matter.

A schematic 600 of the system for predicting status score, utilization score, and performance score of IT resources is illustrated in FIG. 6, according to an embodiment of the present subject matter. As shown, the system includes processing unit 402, memory unit 403, user interface 404, network interface as described in earlier sections. The data extraction module 405 communicates with a plurality of agents 602 for collecting data for the parameters from the one or more end users and servers. The plurality of agents 602 may be computer programs, such as bots, which may work in a specific device or network. The agents 602 may reside in the system and may be invoked to perform specific tasks, such as collecting and reporting metrics related to the parameters. The metrics may be monitored by service desk tools 603 and service monitoring tools 604 that may be installed in the end user devices 305 and the servers 304, respectively. The service desk tools 603 and the service monitoring tools 604 may access data from various sources including, but not limited to, applications, database, memory of the devices or servers. In some embodiments, for each service desk tool 603 or service monitoring tool 604, a dedicated agent may be deployed.

The extracted data may be stored in a data store 605 using a data storage module. The data classifier module 406 may be configured to categorize the data stored in the data store 605 as historical data or current data based on the time identifier. The stored data may be accessed by a middleware, such as a message broker 606. The message broker is an intermediary program that translates messages from the formal messaging protocol of the network nodes to the formal messaging protocol of the system 301. The output from the message broker is provided to a Java interface, such as a message consumer 607, which can identify the appropriate module, like training module 407, to communicate the data. In some embodiments, a data cleanser 608 may be used for detecting inaccurate data from the data store and perform a corrective action on the data. The data cleanser 608 may perform verification of data, rebuilding missing data, and then export the data to the modules. The training module 407 receives the cleansed data to train the prediction model before the prediction module 408 and the alert module 410 perform their respective functions. In some embodiments, a summary generation module 609 may generate a summary of the predicted status, utilization, and performance of the nodes. The summary may provide statistical and graphical representations of the status of a node or the performance and utilization of the nodes. Further, it may provide additional information, such as one or more opportunities of potential outages, the expected time, root cause analysis, reason, severity, probability of potential failure of the node, recommended operators to mitigate the failure, etc. The display module 409 is configured to display a summary of the predicted status, utilization, and performance, via the user interface 404.

The above subject matter and its embodiments provide method and system to determine and prevent potential outages. The present subject matter predicts utilization and performance of infrastructure resources, which helps in enhancing the overall performance of the network. The predictions also enable the operations team to optimize processes, anticipate suspicious trends before loss occurs, gain insights into the causes and relationships of downtime with performance. Further, the invention helps to anticipate performance issues in future and enhance overall productivity, revenue, and security of enterprises.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

While the invention has been disclosed with reference to certain embodiments, it will be understood by those skilled in the art that various changes may be made and equivalents may be substituted without departing from the scope of the invention. In addition, many modifications may be made to adapt to a particular situation or material the teachings of the invention without departing from its scope.

What is claimed is:

1. A computer-implemented method for determining potential outages in an information technology (IT) environment, the computer-implemented method comprising:
    extracting, from one or more data sources, data for one or more parameters associated with a plurality of nodes in the IT environment, the data comprising at least utilization metrics, performance metrics and a time identifier for each of the utilization and performance metrics;

classifying the data as historical data or current data based on the time identifier;
predicting a status score, an utilization score, and a performance score for the plurality of nodes from the classified data, wherein predicting the status score, utilization score, and performance score comprises:
extracting a training dataset from the historical data,
training a prediction model based on the training dataset using a machine learning engine,
providing the current data to the trained prediction model as a test dataset, and
obtaining predictions on the status score, utilization score, and performance score from the prediction model;
determining a potential outage in the IT environment from the predicted scores;
automatically identifying one or more processes with high utilization and less importance based on the determined potential outages and historical data;
displaying a summary, in one or more devices, indicating the predictions and the potential outage, wherein the summary comprises at least trends and statistics associated with the predicted scores;
determining that the predicted scores or potential outage exceed a threshold limit;
triggering automated workflows to kill the one or more identified processes to optimize utilization based on determining that the predicted scores or potential outage exceed the threshold limit;
sending alerts to the one or more devices based on the predicted scores or potential outage exceed the threshold limit;
assigning tickets to one or more operators based on the determined potential outages.

2. A system for determining potential outages in an information technology (IT) environment, the system comprising:
a user interface;
one or more hardware processing units;
a hardware memory unit coupled to the one or more hardware processing units, wherein the hardware memory unit comprises:
a data extraction module configured to extract, from or more data sources, data for one or more parameters associated with a plurality of nodes in the IT environment, the data comprising at least utilization metrics, performance metrics and a time identifier for each of the utilization and performance metrics;
a data classifier module configured to classify the data as historical data or current data based on the time identifier;
a prediction module configured to predict a status score, an utilization score, and a performance score for the plurality of nodes based on the classified data, and determine potential outage in the IT environment from predicted scores, wherein predicting the status score, utilization score, and performance score comprises:
extracting a training dataset from the historical data,
training a prediction model based on the training dataset using a machine learning engine,
providing the current data to the trained prediction model as a test dataset, and
obtaining predictions on the status score, utilization score, and performance score from the prediction model;

identify one or more processes with high utilization and less importance automatically based on the determined potential outages and historical data;
determine that the predicted scores or potential outage exceed a threshold limit; and
trigger automated workflows to kill the one or more identified processes to optimize utilization based on the determined predicted scores or potential outage exceed the threshold limit;
a display module configured to display a summary, in one or more devices, indicating the predictions and the potential outage, wherein the summary comprises at least trends and statistics associated with the predicted scores;
an alert module configured to send alerts to the one or more devices based on the predicted scores or potential outage exceed the threshold limit;
a ticketing module configured to assign tickets to one or more operators based on the determined potential outages.

3. The system of claim 2, wherein the hardware memory unit further comprises a summary generation module configured to generate the summary comprising at least the trends and the statistics associated with the predicted scores.

4. The system of claim 2, wherein the data extraction module communicates with a plurality of agents and counters to extract the data from the one or more data sources.

5. The system of claim 4, wherein the data sources comprise monitoring tools installed on servers, desk tools installed on user devices, or database in the IT environment.

6. A computer program product having non-volatile memory therein, carrying computer executable instructions stored therein for determining potential outages in an Information Technology (IT) environment, the computer executable instructions comprising:
extracting, from one or more data sources, data for one or more parameters associated with a plurality of nodes in the IT environment, the data comprising at least utilization metrics, performance metrics and a time identifier for each of the utilization and performance metrics;
classifying the data as historical data or current data based on the time identifier;
predicting a status score, an utilization score, and a performance score for the plurality of nodes from the classified data, wherein predicting the status score, utilization score, and performance score comprises:
extracting a training dataset from the historical data,
training a prediction model based on the training dataset using a machine learning engine,
providing the current data to the trained prediction model as a test dataset, and
obtaining predictions on the status score, utilization score, and
performance score from the prediction model;
determining a potential outage in the IT environment from the predicted scores;
automatically identifying one or more processes with high utilization and less importance based on the determined potential outages and historical data;
displaying a summary, in one or more devices, indicating the predictions and the potential outage, wherein the summary comprises at least trends and statistics associated with the predicted scores;
determining that the predicted scores or potential outage exceed a threshold limit;
triggering automated workflows to kill the one or more identified processes to optimize utilization based on determining that the predicted scores or potential outage exceed the threshold limit;
sending alerts to the one or more devices based on the predicted scores or potential outage exceed the threshold limit;
assigning tickets to one or more operators based on the determined potential outages.

* * * * *